No. 844,884. PATENTED FEB. 19, 1907.
A. MANS.
SPRING RECOIL NEUTRALIZER.
APPLICATION FILED NOV. 22, 1905.

2 SHEETS—SHEET 1.

Witnesses:

Inventor:
Albert Mans
by B. Singer
Attorney

No. 844,884. PATENTED FEB. 19, 1907.
A. MANS.
SPRING RECOIL NEUTRALIZER.
APPLICATION FILED NOV. 22, 1905.

2 SHEETS—SHEET 2.

UNITED STATES PATENT OFFICE.

ALBERT MANS, OF DIEGHEM-BRUSSELS, BELGIUM.

SPRING-RECOIL NEUTRALIZER.

No. 844,884.  Specification of Letters Patent.  Patented Feb. 19, 1907.

Application filed November 22, 1905. Serial No. 288,574.

*To all whom it may concern:*

Be it known that I, ALBERT MANS, a subject of the King of Belgium, residing in Dieghem-Brussels, Villa les Lierres, in the Kingdom of Belgium, have invented new and useful Spring-Recoil Neutralizers, for which application has been made in Belgium at the 27th April, 1905, No. 184,137; in Germany at the 8th May, 1905, and in Austria at the 15th May, 1905.

This invention has for its object a jolt-mitigator for vehicles of all kinds which equalizes the movements of the frame produced by the recoil of the strip or other springs to which is suspended the frame, while allowing these springs to retain their entire suppleness when flattened or compressed.

The apparatus which has for its object to render the recoil of the suspension-springs gradual is characterized by a cylinder in which a piston is displaced, which is operated or governed by the relative movements of the frame and the axle in such a way that when this piston is displaced corresponding to the flattening of the suspension-springs the air passes from the one side of the piston to the other without opposing resistance to the movment for compressing the spring, while when it is displaced in an opposite direction the communication between the two compartments of the cylinder is intercepted, so that the recoil of the spring is rendered regular by the compression of the air contained in the cylinder on one face of the piston, its rarefaction on the other face, the methodic flow of this air from one compartment into the other, and the value of the initial pressure of the air contained in the cylinder.

Two different arrangements of the improved jolt-mitigator are shown as an example in the accompanying drawings, in which—

Figure 1:
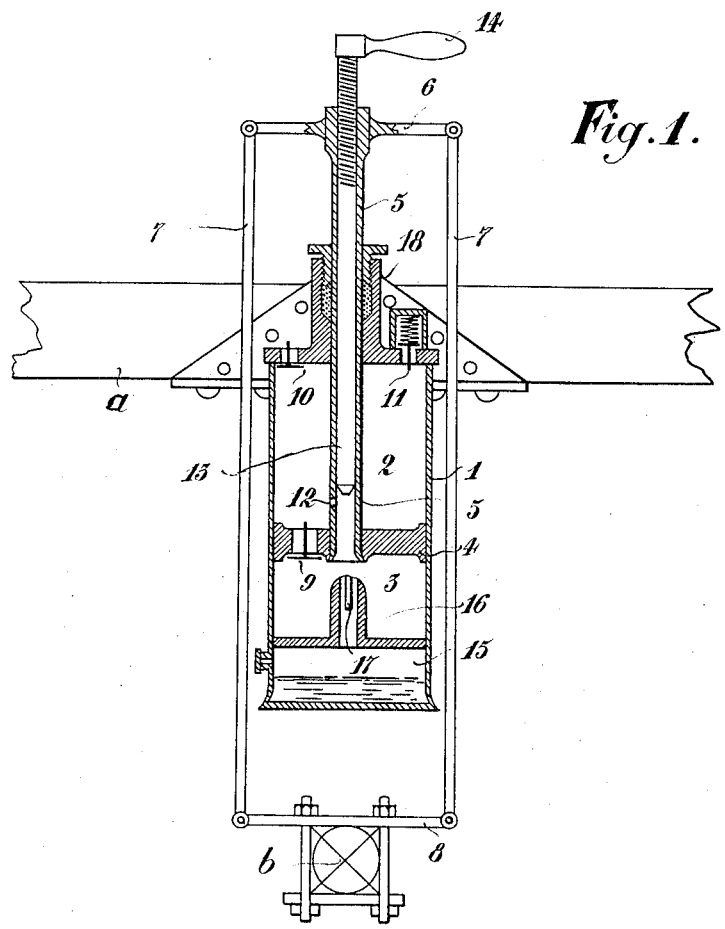
Figure 2:
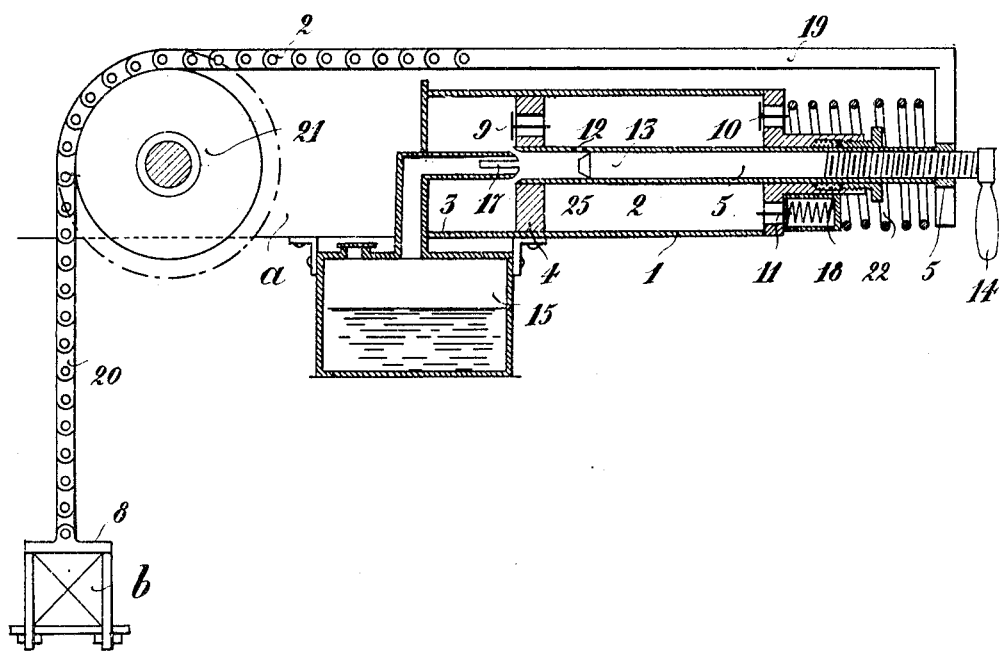

Figure 1 is a vertical section of a device embodying the main features of my invention, showing the same connected with the body and axle, respectively, of the vehicle, said device being vertically disposed; Fig. 2, a diagram of a horizontal arrangement.

This improved jolt-mitigator for vehicles is composed of a metallic cylinder 1, firmly fixed to the framework *a* of the vehicle. The interior of this cylinder is divided into two compartments 2 3 by a movable piston 4, carried by a hollow rod 5, the external end of which is connected by the intermediary of a small cross-bar 6, Fig. 1, with two vertical rods 7, fixed by their lower extremity to a suitable yoke 8 of the axle *b* of the vehicle. The piston 4 is provided with a valve 9, opening toward the compartment 3, while the cover of the cylinder 1 is provided with a valve 10, opening from the outside toward the compartment 2, and a valve 11, opening from the interior of the compartment 2 to the outside, but only when the internal pressure reaches a certain amount. The hollow piston-rod has at a certain height above the pisson 4 a lateral orifice 12, the free section of which may be regulated at will by a pintle 13, screwed in the hollow rod 5 and provided with a suitable handle 14.

In the normal position the compartment 3 communicates with a reservoir 15 by a nozzle 16, fixed to the bottom of the cylinder 1 and provided with a longitudinal slot 17, the object of which will be hereinafter described. The reservoir 15 may be partially filled with any suitable liquid for regulating the volume of the air in it.

The apparatus shown in Fig. 1 works in the following manner: In the normal position the piston 4 stands at a short distance from the bottom of the cylinder 1. Supposing that in consequence of an inequality in the road the suspension-spring of the vehicle is flattened and the axle *b* approaches the frame *a*, this relative movement causes the piston 4 to rise by reason of the rigid connection between the piston and the axle. The valve 9 opens and air passes freely from the compartment 2 into the compartment 3 by the valve 9 and the orifice 12 of the piston-rod. When the suspension-spring of the vehicle has ceased to flatten and the reaction commences, the frame will quickly move away from the axle, and it is this movement which is rendered gradual by the action of the piston 4. In fact, when the piston descends the valve 9 closes, and the air contained in the compartment 3 is partially compressed in spite of the escape of part of this air by the orifice 12 of the piston-rod. The pressure therefore increases in 3 and at the same time in the reservoir 15 until the nozzle 16 commences to penetrate into the hollow rod 5 of the piston, the slot 17 serving to render gradual the interception of communication between 3 and 15 and also between 3 and 2 on the descent of the piston 4. After the complete engagement of this slot in the hollow rod 5 communication is cut off between 3 and 15 and also between 3 and 2. The air compressed in 15 escapes by the aperture 12 into the compartment 2, while the air imprisoned in the compartment 3 is compressed under the piston 4 until the complete mitigation of the reaction of the suspension-spring of the vehicle. During this time the flow of air from 15 into 2 by the aperture 12 will have reëstablished the equilibrium between 15 and 2, and when the piston recoils a part of the air strongly compressed in 3 will escape toward 15 and another part toward 2, so that equilibrium between the three compartments 3, 15, and 2 will be established with rapidity and the pressure from below upward on the piston 4 will only be exercised by a very small volume of air. When the piston 4 has been pushed into its upper position by reason of the flattening of the suspension-springs of the vehicle, the orifice 12 is in the interior of the stuffing-box 18, and all communication is interrupted between the compartments 2 and 3 when the piston descends as long as the orifice 12 is not uncovered. When the piston 4 descends to mitigate the reaction of the suspension-spring, the piston 4 then rarefies the air in the compartment 2, and the valve 10 opens to allow external air to enter 2. At this moment the air partially compressed in 3 passes by 12 into the compartment 2 there increases the pressure, and closes the valve 10. The pressure of air in the compartment 2 has thus become superior to the atmospheric pressure, and this superior pressure will become the initial pressure for the succeeding compression in the compartment 3. In consequence of this at each descent of the piston the pressure of the internal air will constantly increase, whence it results that for the same piston-stroke during the descending movement the valve of the differential pressure on the two faces of the piston increasing in direct proportion to the initial pressure for each movement this general internal pressure of the cylinder may be easily regulated to a given amount and at the same time the amount of the resistance which is to be opposed to the recoil or return of the springs. In order to regulate the general internal pressure of the cylinder, the loaded valve 11, which opens from the interior toward the exterior, will allow the internal air to escape as soon as the latter exceeds a given amount.

The reservoir 15 serves not merely for rendering the compression in the compartment 3 regular, but in addition for preventing the air highly compressed in the latter from forcing back the piston 4 upward. In fact, as soon as the piston 4 has risen to a certain extent communication is reëstablished between 3 and 15 by the slot 17 and the nozzle 16, and the air compressed in 3 instead of continuing to push up the piston 4 passes by 17 and 16 into the reservoir 15 and by the aperture 12 into the compartment 2, so that the reaction of the air highly compressed in 3 is "annulled," so to speak, completely.

The horizontal arrangement, Fig. 2, works in a similar way. The piston-rod 5 is connected to the axle *b* by a bent arm 19 and a chain or other flexible connection 20, winding round a roller 21, carried by the framework *a*. When the framework and the axle approach one another, a spiral spring 22 displaces the piston 4, (this action of the spiral spring will become useless as soon as the internal pressure of the cylinder is sufficient to push back the piston,) while when there is the reaction of the suspension-spring—that is to say, the axle *b* moves away from the framework *a*—the axle will produce a traction on the chain 20 and the piston-rod 5 to produce a mitigation of this reaction by the compression hereinbefore described.

Having now particularly described and ascertained the nature of my said invention and in what manner the same is to be performed, I declare that what I claim is—

1. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by slotted extension adapted to telescope said hollow piston-rod, inwardly and outwardly opening valves for said cylinder, a valve for said piston, and a pintle for said piston-rod adapted to control said orifice.

2. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by slotted extension adapted to telescope said hollow piston-rod, an inwardly-opening valve for said cylinder, a valve for said piston, and a pintle for said piston-rod adapted to control said orifice.

3. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by slotted extension adapted to telescope said hollow piston-rod, an outwardly-opening valve for said cylinder, a valve for said piston, and a pintle for said piston-rod adapted to control said orifice.

4. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by slotted extension adapted to telescope said hollow piston-rod, inwardly and outwardly opening valves for said cylinder, a valve for said piston, and means for controlling said orifice.

5. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by extension adapted to telescope said hollow piston-rod, an inwardly-opening valve for said cylinder, a valve for said piston, and means for controlling said orifice.

6. A spring-recoil neutralizer for vehicles comprising in combination a cylinder having a piston provided with a hollow rod, said rod and cylinder being connected with the body and axle of the vehicle, said piston-rod having an orifice above said piston, a reservoir communicating with said cylinder by slotted extension adapted to telescope said hollow piston-rod, an outwardly-opening valve for said cylinder, a valve for said piston, and means for controlling said orifice.

7. A spring-recoil neutralizer for vehicles comprising in combination a cylinder having a piston and piston-rod, the cylinder and rod being connected with the body and axle of the vehicle, a reservoir adapted to communicate with said cylinder, means for gradually cutting off communication between the reservoir and cylinder on one side of the piston, means for effecting communication between the cylinder and reservoir on the opposite side of the piston, and a valve in said piston opening toward said reservoir.

8. A spring-recoil neutralizer for vehicles comprising in combination a cylinder having a piston and piston-rod, the cylinder and rod being connected with the body and axle of the vehicle, a reservoir adapted to communicate with said cylinder, means for gradually cutting off communication between the reservoir and cylinder on one side of the piston, means for effecting communication between the cylinder and reservoir on the opposite side of the piston, a valve in said piston opening toward said reservoir, and an inwardly-opening valve for said cylinder.

In testimony whereof I affix my signature in presence of two witnesses.

ALBERT MANS.

Witnesses:
L. PARETTE,
GREGORY PHELAN.